(12) United States Patent
Burke (10) Patent No.: US 8,443,724 B2
(45) Date of Patent: May 21, 2013

(54) PROCESS APPARATUS WITH OUTPUT VALVE AND OPERATION THEREOF

(75) Inventor: Murray J. Burke, Oakville (CA)

(73) Assignee: Mascoma Canada Inc., Mississauga (CA)

( * ) Notice: Subject to any disclaimer, the term of this patent is extended or adjusted under 35 U.S.C. 154(b) by 279 days.

(21) Appl. No.: 12/838,041

(22) Filed: Jul. 16, 2010

(65) Prior Publication Data

US 2011/0011282 A1 Jan. 20, 2011

(51) Int. Cl.
*B30B 11/24* (2006.01)
*B01J 19/20* (2006.01)
*B01J 4/00* (2006.01)

(52) U.S. Cl.
USPC .............................. 100/148; 100/45; 100/145

(58) Field of Classification Search
USPC ............ 100/50, 92, 337, 111, 147, 148, 149, 100/150, 45; 162/246
See application file for complete search history.

(56) References Cited

U.S. PATENT DOCUMENTS

| | | |
|---|---|---|
| 797,374 A | 8/1905 | Roberts |
| 3,054,343 A | 9/1962 | Pellett |
| 3,268,638 A | 8/1966 | Tann |
| 3,394,649 A | 7/1968 | Lyn et al. |
| 3,862,594 A | 1/1975 | Stolting et al. |
| 3,865,528 A | 2/1975 | Roess |
| 4,117,776 A * | 10/1978 | Hunt .............................. 100/117 |
| 4,119,025 A | 10/1978 | Brown |
| 4,186,658 A | 2/1980 | Brown |
| 4,211,163 A | 7/1980 | Brown et al. |
| 4,213,747 A | 7/1980 | Friedrich |
| 4,412,485 A * | 11/1983 | Brown .......................... 100/117 |
| 4,457,670 A | 7/1984 | Tomson et al. |

(Continued)

FOREIGN PATENT DOCUMENTS

| | | |
|---|---|---|
| AU | 2005100501 A4 | 7/2005 |
| CA | 2660990 A1 | 8/2009 |

(Continued)

OTHER PUBLICATIONS

International Search Report and Written Opinion dated Oct. 29, 2010, for International Application No. PCT/CA2010/001110.

(Continued)

*Primary Examiner* — Jimmy T Nguyen
(74) *Attorney, Agent, or Firm* — Bereskin & Parr LLP; Kenneth Bousfield; Philip Mendes da Costa (57) ABSTRACT

An apparatus is provided for treating a loose fibrous solid organic feedstock. The apparatus includes a reactor vessel and a compressor operable to introduce feedstock at elevated pressure into the reactor chamber. The apparatus includes means for controlling and modulating moisture level within the reactor. The apparatus includes an outflow or discharge assembly that has its own feeder or drive for packing feedstock into a discharge accumulator. The discharge accumulator feeds an outflow valve, in this case a uni-directional rotation ball valve operated by a servo motor. Discharge from the valve may be carried through a diffuser into a settling cyclone. In operation the ball valve is rotated to open and close the outflow passageway, the rate of rotation being variable in real time. The rate of rotation may be a function of the pressure or other parameters sensed in the reaction vessel, and, particularly, in the accumulator immediately upstream of the ball valve, and of proxy sensed values such as discharge feeder motor current.

10 Claims, 6 Drawing Sheets

U.S. PATENT DOCUMENTS

| | | | |
|---|---|---|---|
| 4,491,504 A | 1/1985 | Engall | |
| 4,582,568 A | 4/1986 | Iyengar | |
| 4,632,795 A | 12/1986 | Huber et al. | |
| 4,700,622 A | 10/1987 | Satake | |
| 4,842,162 A | 6/1989 | Merkel | |
| 4,944,669 A | 7/1990 | Zakich | |
| 4,947,743 A | 8/1990 | Brown et al. | |
| 5,076,160 A | 12/1991 | de Almeida Thompson | |
| 5,171,592 A | 12/1992 | Holtzapple et al. | |
| 5,211,841 A | 5/1993 | Krempp et al. | |
| 5,368,153 A | 11/1994 | Bruke | |
| 5,377,481 A | 1/1995 | Sibley et al. | |
| 5,466,108 A | 11/1995 | Piroska | |
| 5,473,061 A | 12/1995 | Bredereck et al. | |
| 5,516,427 A | 5/1996 | Yoshikawa | |
| 5,585,053 A | 12/1996 | Arai | |
| 5,911,924 A | 6/1999 | Siegrist et al. | |
| 5,960,711 A | 10/1999 | Nordin | |
| 6,247,662 B1 | 6/2001 | Hamilton | |
| 6,416,621 B1 | 7/2002 | Karstens | |
| 6,615,710 B1 * | 9/2003 | Ishigaki et al. | 100/111 |
| 6,875,385 B2 | 4/2005 | Hawley et al. | |
| 7,335,311 B2 | 2/2008 | Christophersson | |
| 7,390,118 B2 | 6/2008 | MacDonald et al. | |
| 2006/0071614 A1 | 4/2006 | Tripathi et al. | |
| 2007/0214971 A1 | 9/2007 | Williams et al. | |
| 2008/0063869 A1 | 3/2008 | Mortazavi | |
| 2009/0057938 A1 | 3/2009 | Zhang | |
| 2009/0087510 A1 | 4/2009 | Hakoda et al. | |

FOREIGN PATENT DOCUMENTS

| | | |
|---|---|---|
| CN | 201053902 Y | 4/2008 |
| CN | 102497924 | 6/2012 |
| CN | 102497975 | 6/2012 |
| CN | 102497977 | 6/2012 |
| CN | 102497974 | 7/2012 |
| DE | 3412158 | 10/1985 |
| FR | 2522585 A1 | 9/1983 |
| GB | 2131342 | 6/1984 |
| GB | 2131342 A | 6/1984 |
| GB | 2444387 A | 4/2008 |
| JP | 6233097 A | 8/1994 |
| WO | 00/07806 | 2/2000 |
| WO | 02096162 | 11/2002 |
| WO | 2008112820 A3 | 9/2008 |
| WO | 2011006253 | 1/2011 |
| WO | 2011006254 | 1/2011 |
| WO | 2011006255 | 1/2011 |
| WO | 2011006256 | 1/2011 |

OTHER PUBLICATIONS

International Search Report and Written Opinion dated Oct. 13, 2010, for International Application No. PCT/CA2010/001112.

International Search Report and Written Opinion dated Sep. 27, 2010, for International Application No. PCT/CA2010/001109.

Bourgeois, J.M., Circuits for Power Correction with Regards to Mains Filtering, ST Microelectronics Application Note, AN 510/0894, 1999.

International Search Report and Written Opinion, dated Oct. 12, 2010, for International application No. PCT/CA2010/001111.

* cited by examiner

PROCESS APPARATUS WITH OUTPUT VALVE AND OPERATION THEREOF

FIELD OF THE INVENTION

This invention relates to the field of apparatus for processing loose materials at elevated pressure, and, in particular, to apparatus through which the loose material may pass while undergoing a reduction in pressure.

BACKGROUND OF THE INVENTION

A number of industrial processes involve the introduction of a loose solid organic feedstock into a pressurized reaction chamber or vessel. Unless the process is limited to batch operation this may require that the feedstock be pressurized and forced into the reaction vessel while the reaction vessel is maintained at elevated pressure, and possibly also at elevated temperature.

Earlier work in this field is shown, for example, in U.S. Pat. No. 4,119,025 of Brown, issued Oct. 10, 1978; U.S. Pat. No. 4,947,743 of Brown et al., issued Aug. 14, 1990; and PCT Application PCT/CA99/00679 of Burke et al., published as WO 00/07806 published Feb. 17, 2000, the subject matter of all of these documents being incorporated herein by reference.

At the end of the process, the loose fibrous typically organic material leaves the reaction chamber through a discharge assembly of some kind, whence it is collected for further use or processing. To the extent that the process feedstock is then to be used as an input to a subsequent process, such as a biological digestion process, it may be desirable that the fibrous material be finely expanded.

SUMMARY OF THE INVENTION

In an aspect of the invention there is an apparatus for processing fibrous organic feedstock. The apparatus includes a compressor operable to raise the fibrous organic feedstock to a processing pressure; a reactor vessel through which to process the fibrous organic feedstock under pressure; and a discharge or decompression assembly mounted to receive the fibrous organic feedstock of the reactor vessel. The discharge or decompression assembly includes a collector and a drive member operable to pack the fibrous organic feedstock into the collector. An outflow governor is mounted to the collector. The outflow governor is movable between a closed position for retaining feedstock in the collector and an open position for permitting egress of the feedstock from the collector. The outflow governor has an outflow governor drive. The outflow governor drive has a continuously variable speed control. The speed control is operable to alter both the duration of the outflow governor in the open position and the ratio of time spent in the open and closed positions.

In a feature of that aspect of the invention, the control is operable to cycle the outflow governor between open and closed conditions in excess of 40 times per minute. In another feature the apparatus includes sensors operable to monitor pressure upstream of the outflow governor and the digital electronic controller is connected to cause operation of the outflow governor in response to pressure signals and in response to load sensed in the collector, by the proxy of monitoring motor current. In another feature, the apparatus includes at least one heat transfer interface at which heat may be added to said reactor vessel and any contents thereof, and at least one moisture modification input or interface by which to modulate moisture level within the reactor vessel. The outflow governor is connected to open in response to presence of feedstock in the collector and sensing of a minimum outflow pressure threshold.

In another feature, the apparatus includes control logic to (a) shorten outflow governor closed time when resistance to packing of the outfeed collector increases; (b) lengthen outflow governor open time when resistance to packing of the outfeed collector increases; (c) increase the ratio of outflow governor open time to outflow governor closed time as proportions of total outflow governor cycle time; (d) bias said outflow governor to reduce outflow open time to a minimum threshold value; or (e) immediately to move said outflow governor to the closed position when pressure upstream falls below a designated set point value, or all of them.

In another aspect of the invention there is a process for treating a loose fibrous feedstock. That process includes establishing the loose fibrous feedstock in a reactor vessel at an elevated pressure relative to ambient; passing charges of the feedstock through a sudden expansion, which may be substantially adiabatic and isentropic; and controlling decompression cycle parameters in real time with a variable speed outflow valve.

In a feature of that process, the variable speed outflow valve is a ball valve. In an additional feature, the process may include driving the ball valve uni-directionally and varying speed in that one direction. In another feature, the process includes employing sensors to observe pressure in the reactor vessel upstream of the outflow valve, and modulating operation of the outflow valve in response to pressure sensed upstream of the outflow valve. In a further feature, it includes at least one of: (a) maintaining the outflow valve in an open condition for less than one second; (b) maintaining the outflow valve in an open condition for $t_{Open}$, and maintaining the outflow valve in a closed condition for $t_{Closed}$ where $t_{Open}$ is less than ¼ of $t_{Closed}$; (c) sensing pressure drop upstream of the outflow valve while the outflow valve is open, and driving the outflow valve closed immediately if pressure drop exceeds a set threshold value, $P_{Dropref}$; (d) sensing presence of feedstock in a collector mounted upstream of the outflow valve, and inhibiting opening of the outflow valve unless feedstock is inferred to be present; (e) setting a minimum open condition time reference value, $t_{Ref}$, for the outflow valve, and biasing the opening time of the outflow valve, $t_{Open}$, toward $t_{Ref}$; (f) opening and closing the outflow valve in the range of 20 to 120 times per minute.

In a further feature, the process includes (a) opening and closing the outflow valve at least 40 times per minute; (b) maintaining a total cycle time, $t_{total}$, of less that 2 seconds, where $t_{total}$ is the sum of valve open time, $t_{Open}$, and valve closed time, $t_{Closed}$; (c) maintaining a ratio of valve open time, $t_{Open}$, and valve closed time, $t_{Closed}$ that is less than 1:5, or all of them. In still another feature, the process includes providing a feedstock collector upstream of the outflow valve; providing a drive to pack feedstock into the collector; monitoring drive motor electrical current; monitoring pressure immediately upstream of the outflow valve; inhibiting opening of the outflow valve until drive motor electrical current exceeds a threshold current value, $I_{valveopen}$, and reactor pressure immediately upstream of the outflow valve is at least as great as a pressure minimum discharge triggering value, $P_{valve}$ open; closing the valve at the earliest of: (a) timing out against a set reference value, $t_{Long}$; (b) sensing a drop in electrical motor current to below a set reference value $I_{Lowref}$; (c) sensing a drop in pressure greater than a set reference value $P_{Dropref}$. In yet another feature the process include biasing either or both (a) the outflow valve open time period, $t_{Open}$, to the shortest period of time consistent with the foregoing operating conditions, and (b) the ratio of outflow valve open time, $t_{Open}$, to outflow valve closed time, $t_{Closed}$, to the minimum value consistent with the other operating conditions.

In still yet further features, the process includes heating the feedstock in the reaction chamber to a temperature corresponding to saturated water vapour temperature at the pressure of the reactor chamber, or maintaining a moisture level within the reaction chamber in a preset range, or both. In another feature it includes maintaining a ratio of valve open time, $t_{Open}$, to valve closed time, $t_{Closed}$, in the range of 3:1 and 10:1, or more narrowly, a ratio of valve open time, $t_{Open}$, to valve closed time, $t_{Closed}$, in the range of 5:1 and 8:1. The outflow control valve may be inhibited from opening when the current draw is less than 70% of $I_{fl}$, and may be inhibited from closing when $I_{fl}$ is greater than 50% of $I_{fl}$. The process may have a target control valve time open, $t_{Open}$, of less than ½ second. The reactor vessel may be maintained at a pressure in excess of 190 psig, and temperature in the reactor vessel is maintained at the corresponding steam table saturated temperature. More narrowly the target reactor vessel pressure is 245 psig +/−5 psig. Control valve closing may be initiated on a fall in pressure of 2 psig, and is immediate on a fall in pressure of 5 psig.

These and other aspects of the invention are described in the description and illustrations.

BRIEF DESCRIPTION OF THE ILLUSTRATIONS

The invention may be explained with the aid of the accompanying illustrations, in which:

FIG. 1b is a profile or side view of the process apparatus of FIG. 1a;

FIG. 1c is a top view of the process apparatus of FIG. 1a;

FIG. 1d is an end view of the process apparatus of FIG. 1a;

DETAILED DESCRIPTION

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals.

The terminology used in this specification is thought to be consistent with the customary and ordinary meanings of those terms as they would be understood by a person of ordinary skill in the art in North America. Following from the decision of the Court of Appeal for the Federal Circuit in *Phillips v. AWH Corp.*, and while not excluding interpretations based on other sources that are generally consistent with the customary and ordinary meanings of terms or with this specification, or both, on the basis of other references, the Applicant expressly excludes all interpretations that are inconsistent with this specification, and, in particular, expressly excludes any interpretation of the claims or the language used in this specification such as may be made in the USPTO, or in any other Patent Office, unless supported by this specification or in objective evidence of record in accordance with In re Lee, such as may demonstrate how the terms are used and understood by persons of ordinary skill in the art, or by way of expert evidence of a person or persons of experience in the art.

In terms of general orientation and directional nomenclature, two types of frames of reference may be employed. First, inasmuch as this description refers to screws, screw conveyors or a screw compressors, it may be helpful to define an axial or x-direction, that direction being the direction of advance of a feedstock or work piece material along the screw when turning, there being also a radial direction and a circumferential direction. Second, in other circumstances it may be appropriate to consider a Cartesian frame of reference. In this document, unless stated otherwise, the x-direction is the direction of advance of the work piece or feedstock through the machine, and may typically be taken as the longitudinal centerline of the various feedstock flow conduits. The y-direction is taken as a horizontal axis perpendicular to the x-axis. The z-direction is generally the vertical axis. In general, and unless noted otherwise, the drawings may be taken as being generally in proportion and to scale.

Apparatus 20—General Overview

A process apparatus 20 is shown in general arrangement in FIGS. 1a, 1b, 1c, 1d and 1e. It may be an apparatus for treating, or processing, fibrous organic solid feedstock. In the direction of flow of the feedstock material, there is a first assembly 22 that may be an input feeder at which feedstock material is introduced. For the purposes of this discussion, the feedstock may be taken as being organic feedstock such as corn stalks, or sugar cane stalks, or bamboo, or wood chips, or bark, or sawdust, and so on. The feedstock may be fibrous, may be anisotropic, and may by hydrophilic to a greater or lesser extent such as in the example of wood chips or wood flakes derived from the processing of green wood. The feedstock may have an initial moisture content of between 10% and about 65% to 70% by weight, and may typically be processed with an initial moisture content in the range of 35 to 55% by weight.

Input feeder or input, or input conveyor 22 is attached to, and conveys feedstock material to, a multi-stage feedstock compression apparatus 24, which may be a co-axial feeder, that includes a first stage of compression indicated generally as 26, which may be a compression zone, such as a first stage compression zone or compression screw assembly, and a second stage of compression indicated generally as 28, which may be a second compression stage zone or piston zone assembly. Output from the piston zone, i.e., the second stage of compression 28, is fed through a discharge section to a reaction vessel in-feed assembly, indicated generally as 30. Assembly 30 includes a substantially vertically oriented digester drop chute or in-feed head chamber 32, an in-feed conduit or duct or insert, or digester insert 34; and a choke cone assembly 36. In-feed head chamber 32 is in essence part of the larger reactor, or reaction chamber or vessel, or digester assembly, 40, which may be referred to as a digester, and which includes not only head chamber or digester drop chute 32 but also a substantially horizontally, longitudinally oriented vessel, which may be termed the main reactor vessel or digester, 42. Main reactor vessel 42 may have an out feed or output assembly, which may also be called the discharge tube, 44. The entire apparatus may be mounted on a base or frame, indicated generally as 46. The reactor vessel may sometimes be termed a digester, and in other circumstances may be termed a hydrolyzer. In-feed assembly 30 is connected to main reactor vessel, or digester, 42 at a flanged coupling, indicated as 48. While only a single main reactor vessel is shown, other intermediate processing steps and their associate reactor vessels could also exist, and could be placed between in-feed assembly 30 and reactor vessel 42, connected at suitable flanged couplings such as coupling 48, as may be.

In one such process an organic feedstock in the nature of a loose lignocellulosic or partially lignocellulosic i.e., wood-based or wood-like feedstock is pressurized to perhaps 245 psig, and heated in the reaction chamber to saturated temperature of partially liquid water and partially water in vapour form. Moisture may be added or extracted, as may chemical solutions. The feedstock is held at this pressure and temperature for a period of time as it advances along the reaction chamber. At the discharge apparatus there is a more or less instantaneous, substantially adiabatic, and substantially isentropic expansion. The almost instant reduction in pressure may tend to result in the water trapped in the moisture absorbent wood chips or flakes tending to want to undergo a change of state from liquid to vapour almost instantaneously, with a resultant expansion within the feedstock that is perhaps not entirely unlike steam expansion in the making of popcorn. The result is that the fibres of the feedstock tend to be forced apart and in some sense beaten, making a finer, looser product. The product so obtained may have a relatively high ratio of surface area to volume, and may be "tenderized" in a sense, such that the fibres may more easily be broken down in digestive processes of micro-organisms, e.g., bacteria, fungi, viruses, and so on, by which those fibres may be more readily converted to other chemicals, such as ethanol.

Input Feeder 22

Input feeder 22 may include a collector vessel, which may be termed a reservoir, a trough, or a hopper 50. It includes a feed advancement apparatus, or feeder 52, which may be a conveyor, whether a belt conveyor or screw conveyor or auger 54 as shown. A drive 56 is provided to run auger 54, drive 56 being mounted on the far side of a downfeed housing 58, with the drive shaft extending in the horizontal longitudinal direction through the housing to auger 54. Downfeed housing 58 is mounted atop, and in flow communication with, an input housing 60 of compressor apparatus 24.

First Stage Compressor 26

Compression apparatus or co axial feeder 24 is mounted to a base plate 62, which is mounted to frame 46. First stage compressor or compression screw zone 26 includes a moving compression member, 64, a stationary compressed feedstock retaining member 66, input housing or feeder hopper 60, a bearing housing or bearing housing assembly 68 (and, inherently, the bearing contained therein), a drive identified as a compression screw reducer 70, and a drive coupling 72, and an array of preliminary infeed feed-stock conveyor members such as may be identified as triple screw assemblies 74.

Moving compression member 64 may be a compression screw 76. Compression screw 76 may include a volute having a variable pitch spacing between the individual flights or turns of the volute, either as a step function or, as in the embodiment illustrated, have a continuously decreasing pitch spacing as the tip of the screw is approached in the distal, forward longitudinal or x-direction. Compression screw 76 has a longitudinal centerline, and, in operation, rotation of screw 76 causes both forward advance of the feedstock material along the screw, and, in addition, causes compression of the feedstock in the longitudinal direction. The base or proximal end of screw 76 is mounted in a bearing, or compression screw bearing housing assembly 68 having a flange that is mounted to a rearwardly facing flange of input housing such as may be termed a feeder hopper 60. The keyed input shaft of screw 76 is driven by the similarly keyed output shaft of drive or reducer 70, torque being passed between the shafts by coupling 72.

Compression screw drive 70 includes a compression screw drive motor 80 mounted on its own motor base 78, which is mounted to base plate 62. Motor 80 may be a geared motor, and may include a reduction gearbox. Motor 80 may be a variable speed motor, and may include speed sensing, monitoring, and control apparatus operable continuously to vary output speed during operation.

Feedstock entering drop chute 58 is urged by gravity into input housing 60, and generally toward compression screw 76. To aid in this migration, feed-stock conveyor members 74 may be used to direct the feed-stock to compression screw 76. Members 74 may have the form of two generally opposed, inclined banks of twin screws or triple screws or augers 82, mounted generally cross-wise to screw 76. Screws 82 are driven by motors 84 mounted to input housing 60. Screws 82, of which there may be four, six or eight, for example, may be in a V-arrangement.

Second Stage Compressor 28

The second stage of compression, or second stage compressor 28 includes a frame, or stator, or housing, or spider, indicated generally as 100; a moving compression member or piston 102; a feedstock retainer 104 that co-operates with moving compression member or piston 102; and a motive drive and transmission assembly 110, which may also be referred to as a ram drive assembly.

The moving compression member 102 may be a reciprocating piston 112. The feedstock retainer may define a de-watering section 130. De-watering section 130 performs both the function of retaining the feedstock as it is compressed and the function of a sieve or colander that allows liquids to be drained off. The term "de-watering" refers to squeezing liquid, or air, out of the feedstock during compression. While this liquid may be water, or predominantly water, it may be a juice or oil, or it may include removal of gases, such as air. The term "de-watering" is not intended to imply that the apparatus is limited only to use with water or water based liquids.

Downstream of de-watering section 130 there is a tail pipe or discharge section, which may also be identified as a compression tube, 184, through which compressed feedstock is driven by the action of the compressor stage. Discharge section compression tube 184 may include a cooling manifold, or compression tube cooling jacket, 186. Discharge section 184 ends at a downstream flange 192. Flange 192 mates with a corresponding flange 194 of the reactor vessel in-feed tail pipe or digester insert 196, which may typically be of slightly larger inside diameter than the downstream end of discharge, but which may also have the slight outward flare or taper of section 184.

Choke Cone Assembly 36

Choke cone assembly 36 is mounted to vertical pipe or hydrolyzer drop chute 200 in axial alignment with, i.e., concentric with, the horizontal discharge pipe of the compression section, namely digester insert 196. It includes a horizontal stub pipe, or choke cone nozzle 202 in which a longitudinally reciprocating shaft, or choke cone shaft 204 is mounted. The inner end of shaft 204 carries a pointed, generally conical cap or choke cone 206 that is mounted in concentric axial alignment with digester insert 196. Choke cone 206 has a broadening skirt 208 such as may seat in the end of insert 196 at full extension. Assembly 36 also includes a reciprocating drive 210 mounted in axial alignment with shaft 204 on the centerline of the unit, and a sensing assembly 212, which may be a load cell, by which to sense the position of shaft 204, and hence choke cone 206, and the force acting against choke cone 206. Shaft 204 is mounted on a pair of axially spaced apart bearings 205, and passes through a set of seals or glands, identified as choke cone packing rings 216.

Main Reactor Vessel or Digester Assembly 40

The main reactor chamber, or digester assembly, 40, may include a pressure vessel 220, which may have the form of a substantially cylindrical tube, with suitable pressure retaining end fittings. The cylindrical tube may be inclined on a gentle downward angle from input to output. Pressure vessel 220 may have a feedstock conveyor, or which one type may be a central retention screw 222 driven by a main motor and reduction gearbox 224. Retention screw 222 may include a hollow central shaft that is connected to a source of heat, such as steam heat, and to the extent that it is heated, the volute, or paddles, or retention screw flights 223, those flights are also radially extending heat exchanger fins that establish a heat transfer interface. One advantage of such an arrangement is that it permits the introduction of heat into the reactor vessel, and hence into the feedstock, without changing the moisture content in the feedstock. Screw conveyor 222 may fit generally closely within the inner wall of the reactor vessel, such that as the screw turns, the feedstock may tend to be driven or advanced along the central axis. Pressure vessel 220 may be a double walled pressure vessel, and the space between the inner and outer walls may be connected to a source of heat, such as steam heat, it is heating the volume of the vessel as well, or may be insulated and may house heating elements, as may be appropriate for the particular industrial process for which apparatus 20 is employed. Pressure vessel 220 may be provided with a number of taps or nozzles or spray nozzles 214, 218 at which liquids or chemicals in fluid or solid form may be introduced or extracted according to the nature of the process. Pressure vessel 220 may also include heating apparatus, again, according to the desired process. As noted, feedstock is directed into the main body of the pressure vessel by the vertical digester drop zone. Feedstock may leave pressure vessel 220 at the output assembly 44. The pressure in the reactor vessel, or digester, may, in the broadest range, be in the range of 75-500 psig. A narrow range of 170 to 265 psig may be employed, and a still narrower range of 190 to 235 psig may be desired if the process is a steam only process. If acids are used to aid in breaking down the wood fibres, the pressures may tend to be toward the lower ends of these ranges. Temperatures in the reactor vessel may typically be in the range of 170-220 C, and, more narrowly, 200-210 C. The residence time of feedstock in the reactor chamber may be of the order of 4 to 14 minutes and typically 5 to 9 minutes but could be longer or shorter as may be suitable.

Output or Discharge Screw and Discharge Tube Assembly 44

Figure 1A:
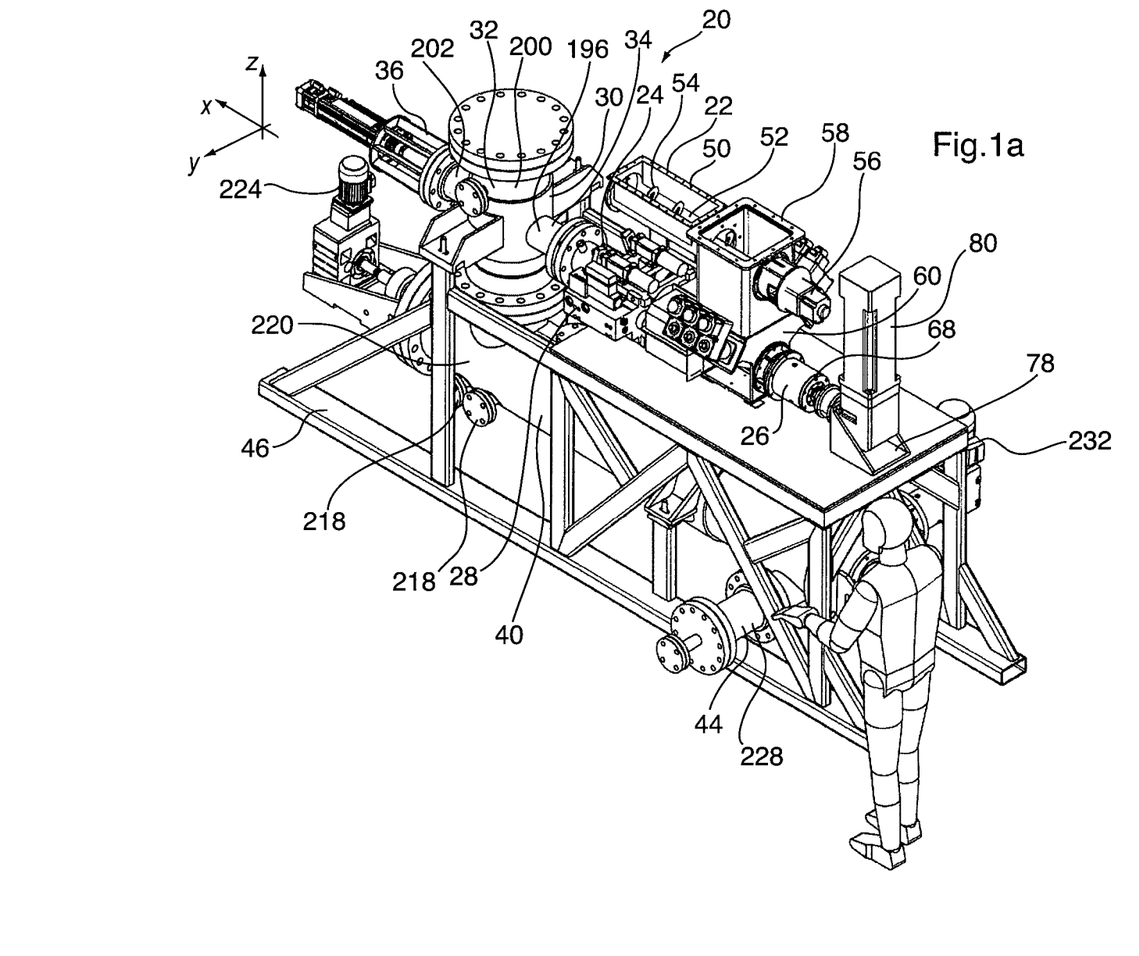
FIG. 1a is a general arrangement in perspective of a high pressure process apparatus having a feed compressor assembly according to an aspect of the present invention.
Figure 1B:
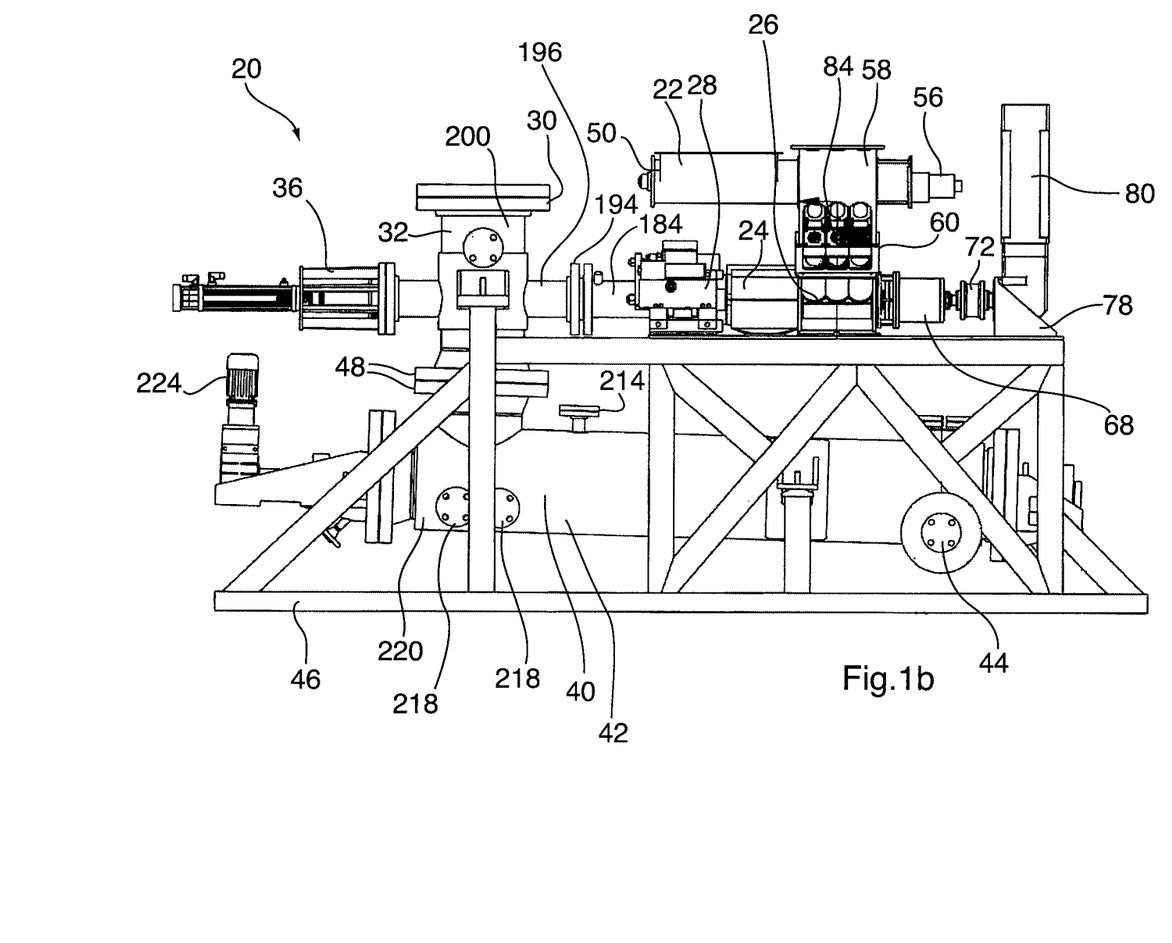
Figure 1C:
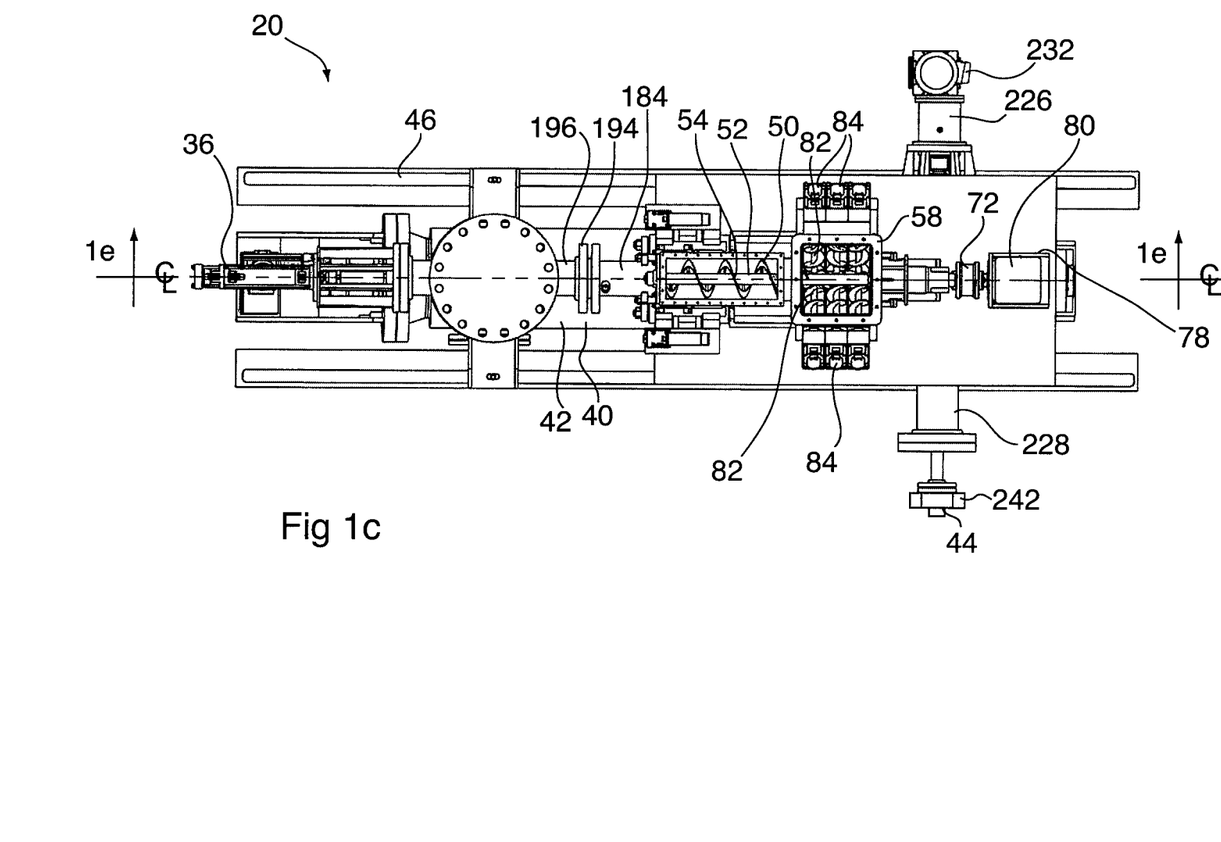
Figure 1D:
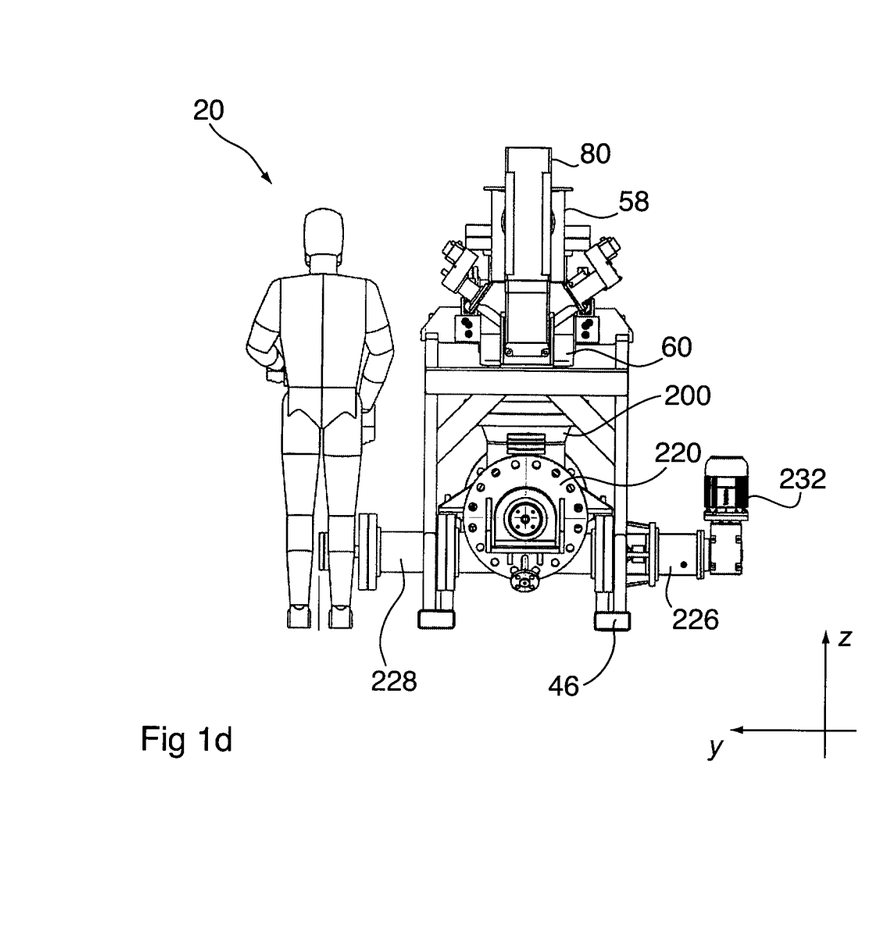
Figure 1E:
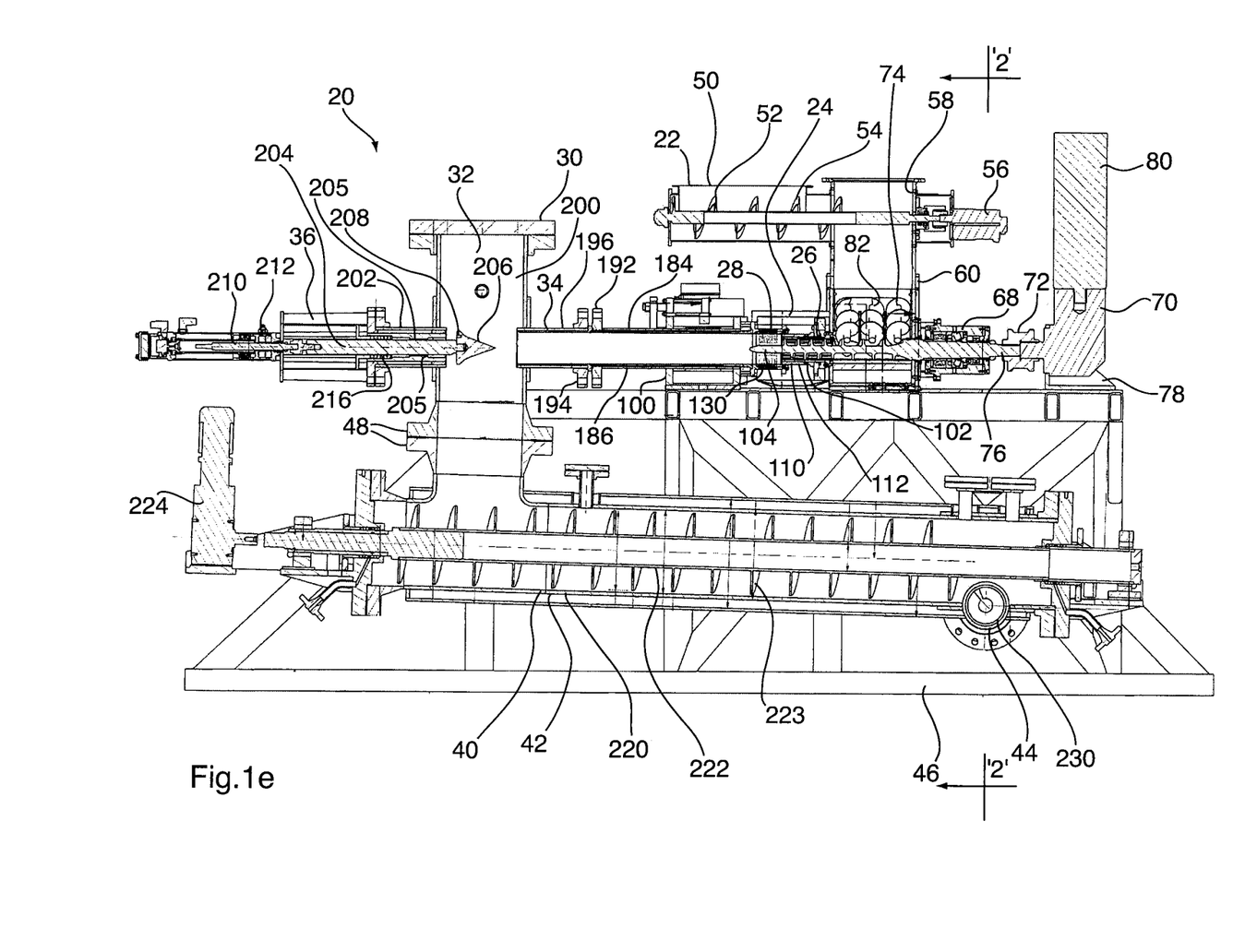
FIG. 1e is a longitudinal cross-section along the central vertical plane of the process apparatus of FIG. 1a, indicated as section '1e-1e' in FIG. 1c.
Figure 2:
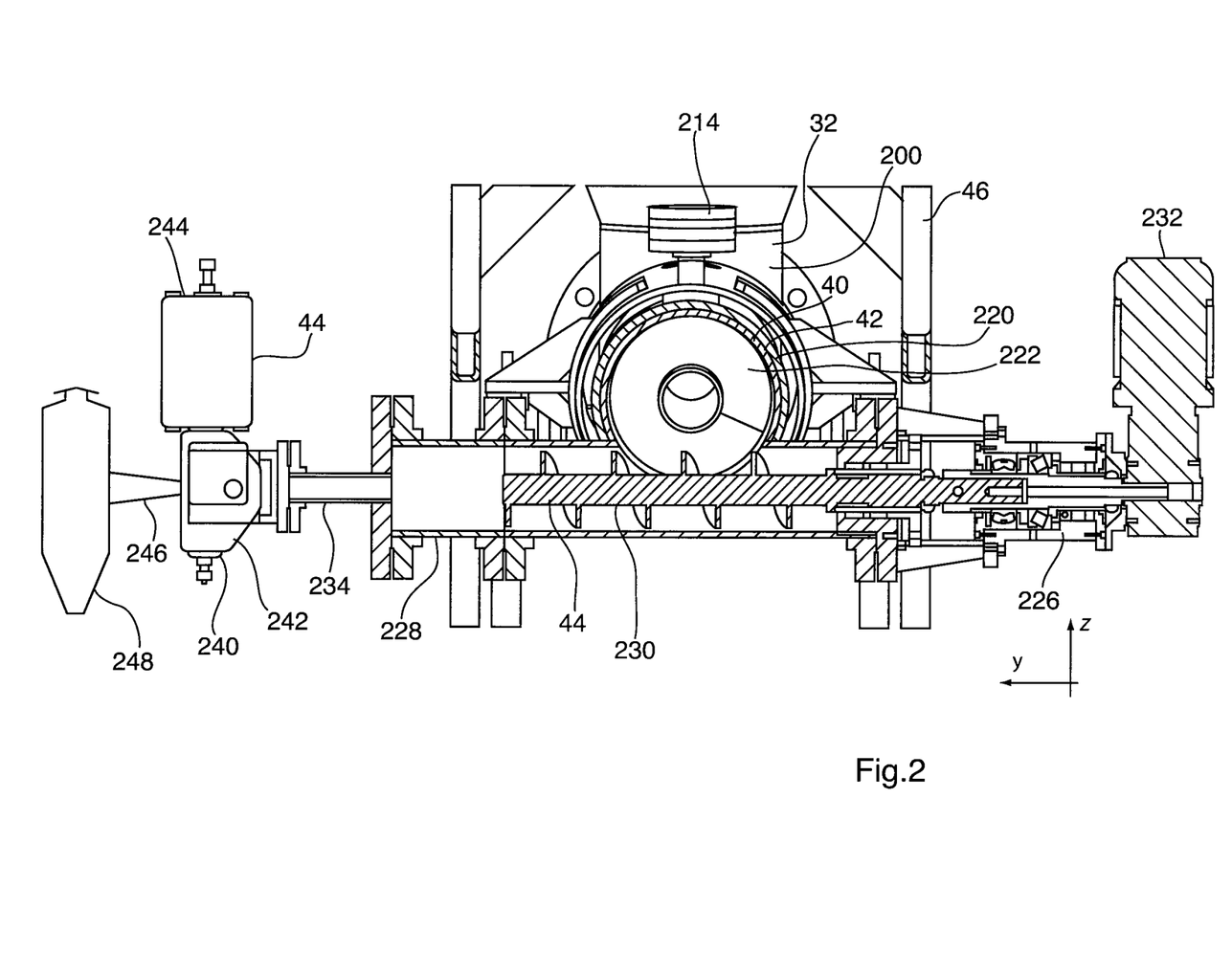
FIG. 2 is a horizontal lateral cross-section of the apparatus of FIG. 1a taken on section '2-2' of FIG. 1c.

The discharge, de-compression, or output assembly, which may also be termed the discharge screw and discharge tube assembly, 44 may be mounted cross-wise to the main longitudinal axis of the reactor vessel, e.g., pressure vessel 220. There may be two pipe stubs, those being a drive stub and an output stub or pipe flanges 226, 228 respectively mounted to, and forming arms or extensions of, pressure vessel 220. A screw or auger or discharge screw 230 may be mounted between the retention screw bearing arrangement and digester discharge tubes 226, 228, e.g., at a level rather lower than the centerline of pressure vessel 220. Auger 230 may be driven by a motor, or discharge screw drive 232. Screw 230 passes beneath, and clear of, the main screw, namely pressure vessel retention screw 222. The volute of retention screw 222 ends just before, i.e., longitudinally shy or short in the direction of advance of, cross-wise mounted discharge screw 230, as shown in FIG. 1e. The transverse discharge screw 230 feeds an output duct, or pipe identified as discharge tube 234, which, in turn carries feedstock to an outflow governor, such as an outlet valve 240, which may be termed a blow valve. The output duct or pipe or discharge tube 234 in effect defines a first-in-first-out output collector or accumulator or discharge antechamber. It is conceptually somewhat similar to an electrical capacitor in which a charge or plug of material for output can be accumulated in the collector awaiting discharge. The plug has in part a function somewhat akin to a wadding in a gun barrel where, in desired operation, there will always be a pad or plug or wadding of porous feedstock obstructing the outflow. The size of the pad or plug waxes and wanes as the outflow valve opens and closes extracting material from the downstream end of the pad or plug, with the pad being constantly replenished on its upstream end by the action of screw 230. Transverse screw 230 then functions as a drive or packer. It forms and packs a wad or charge or pad of feedstock in the collector. If the pad is sufficiently large, the quantity of the charge will be less than the amount discharged in one cycle of the valve. The end of stub 228 extending longitudinally beyond the tip of auger 230 may have a flare, or outward taper in the downstream direction, comparable to the flare of the infeed pipe from the compressor discharge section, to discourage the feedstock from jamming in the pipe. The taper may be about 30 minutes of arc.

Outlet valve 240 may be a ball control valve 242, of which one type is a Neles Series E ceramic ball valve such as may be used in abrasive applications where erosion resistance may be desirable and which may not necessarily be shown to scale in the illustrations. The flow path of this valve may be lined with a material that includes magnesia partially stabilized with zirconia. Valve 242 is a motorized valve, and may include a drive or drive motor, identified as blow valve servo motor 244, which may be a stepper motor with continuous speed variation. Valve 242 may include an internal ball with continuous 360 degree rotation. It may be appreciated, each time the ball turns 180 degrees, an incremental discharge or "blow" will occur in view of the pressure drop from $P_{high}$ inside pressure vessel 220 to $P_{ambient}$ outside pressure vessel 220. Valve 242 may be a uni-directional valve, or may be used only to turn uni-directionally, be it always clockwise or always counter-clockwise, rather than reversing between the two. Valve 242 is an electronically controlled valve in which the operation of motor 244, and the speed variation thereof, may be made in response to both pre-programmed values and parameter values sensed in apparatus 20 more generally. Those parameters may include pressure immediately upstream of valve 242, drop in that value, rise in that value, differentials thereform of rate of change thereof; may include temperature, moisture of other values in the process, and may include parameters related to motor load and performance from which the presence of feedstock in the accumulator may be inferred, or a fault inferred, an easily monitored value being electric motor current draw. As above, the clock speed of the digital electronic monitoring and control equipment may be of the order of 1 GHz, while the frequency of blows may be of the order of 30-60 Hz.

A typical internal pressure may be in the range of 245 psig at a saturated mixture of steam, for example. The rate of motion of ball valve 242 may be such that the period of opening is somewhat like the opening of a camera shutter or aperture, or nozzle, and in that short space of time the feedstock exits the reactor in what is more or less an explosion. To the extent that there is a level of moisture in the reactor and absorbed in the feedstock, it may tend to be a steam explosion. The length of the outlet duct past the end of the auger may be in the range of 4:1 to 10:1 times its diameter. All of the motors of apparatus 20 may be servo motors with continuously variable, digitally controlled speed. The pressure immediately upstream of ball valve 242 may be monitored, as may motor current on the discharge screw drive, namely motor 232. When there is a "no load" current in motor 232, the controller may signal a decrease in speed of motor 232 to attempt more quickly to re-establish an adequate plug of feedstock in the outflow collector. Conversely, where the load current is too high, as may indicate a blockage, the controller may signal an increase in motor speed until current returns to an acceptable level with the discharge of material when valve 242 is opened, or, if this does not resolve the matter within a set period, $t_{Long}$, e.g., 1 sec or 2 sec., and the controller times out, the controller may then signal cessation of motor current to motor 244 to move to a more open discharge period.

As may be appreciated, rapidly depressurizing feedstock may be blown through the open aperture or nozzle defined by ball valve 242 at quite high velocity, particularly if, at the same time, there is an adiabatic, isentropic expansion as the moisture in the feedstock changes state from liquid to gas, e.g., water vapour. Processed feedstock leaving ball valve 242 may be discharged through outlet ducting, which may be in the form of a broadening passageway, which may be a diffuser, indicated conceptually as 246. The output flow may then expand and decelerate in the diffuser. The outlet ducting may be connected to a settling chamber or cyclone, indicated conceptually as 248, at which the processed feedstock may be separated from the liberated steam, and may further decelerate and settle out of the carrier gas (i.e., steam) flow, and may be collected, and whence it may be removed to storage or for further processing, such as use as feedstock in producing ethanol or other products. Motor 244, diffuser 246, and cyclone 248 may not be shown to scale in the illustrations.

The explosion of feedstock at the outlet may tend to be most effective when the pressure differential is greatest, the reduction in pressure most rapid. Valve 242 then acts like a relatively rapidly moving shutter. It may be advantageous for the shutter to be open only for a very brief moment so that a reduction in driving pressure at the ball valve is negligible. To that end, variable control of the ball valve servo motor may permit both the time of exposure of the shutter, i.e., the time period at which the valve is open, and the interval between openings of the shutter to be controlled continuously as a function of time. It may be desirable for the opening time period, $t_{Open}$, to be as short as practicable, many short bursts being thought to be more effective in treating the feedstock than a smaller number of longer bursts or blows.

Typically, the ratio of valve closed time, $t_{Closed}$, to valve open time, $t_{Open}$, may be of the order of perhaps 3:1 to 10:1. The total time, $t_{Total}$, for 180 degrees of rotation of the valve may be as little as ½ second, including both open and closed time, or 120 Hz, corresponding to a mean rotational speed of roughly 60 r.p.m. at two openings per revolution. A more typical total time for 180 degrees of rotation might be 1 s to 2 s, or 60-30 Hz. In normal operation the valve would be expected to move or cycle between open and obstructed or closed positions 40 times a minute or more. The valve may be open for 1 s, closed for 5 s or closed for 8 s. Alternatively, the valve may be closed for 1 s, and open for ⅕ or ⅛ second.

In operation, the auger motor may have a full load current draw, $I_{fl}$, somewhat in excess of 10 Amps, and a no load current draw of 3 Amps. When the current draw exceeds 80% of full load it may be inferred that there is a plug of feedstock in the outlet pipe, and the control may signal for the valve to be opened. The valve may have a target open time period, $t_{Ref}$, perhaps of ¼ s. possibly somewhat less such as ⅕ s to or ⅛ s. If the pressure immediately upstream of the valve falls 2 psig prior to the expiry of that time period, e.g. ¼ s, the control may signal for the valve to close. Motor current may drop to a value close to "no load", perhaps 40% or less of the full load value. If, abnormally, that pressure drop should exceed a reference value, $P_{DropRef}$, be it as much as 4 or 5 psig, the programmed logic of the controller may infer that there is no plug left in the outlet pipe accumulator, which is undesirable. Valve 242 must then be closed immediately. When valve 242 is closed, discharge screw 230 replenishes the plug with feedstock until the threshold motor current draw is reached. Alternatively, if the valve is open for the target time period, $t_{Ref}$, ¼ s, perhaps, and the motor current does not fall below some threshold value, such as 50% of full load, then the closed portion of the cycle needs to be shorter. If the closed portion becomes as short as possible, (though not necessarily so, assumed to be $t_{Ref}$) due to the practical physical limitations of the valve, or a limit on the value imposed by the controller as a speed governor, then the length of opening time must be increased. If there is a high current draw at the same time as a low pressure signal, a fault signal will be generated and a warning or alarm signal sent to the operator and the process taken off-line.

Then, in summary, the foregoing describes an apparatus and method for processing fibrous organic feedstock. The apparatus includes a compressor operable to raise the fibrous organic feedstock to a processing pressure; a reactor vessel through which to process the fibrous organic feedstock under pressure; and a discharge assembly mounted to receive the fibrous organic feedstock of the reactor vessel. The discharge assembly includes a collector and a drive member operable to pack the fibrous organic feedstock into the collector. An outflow governor is mounted to the collector. The outflow governor is movable between a closed position for retaining feedstock in the collector and an open position for permitting egress of the feedstock from the collector. The outflow governor has an outflow governor drive. The outflow governor drive has a continuously variable speed control. The speed control is operable to alter both the duration of the outflow governor in the open position and the ratio of time spent in the open and closed positions.

The variable speed control is operable to cycle the outflow governor between open and closed conditions in excess of 40 times per minute. The apparatus includes sensors operable to monitor pressure upstream of the outflow governor and the digital electronic controller is connected to cause operation of the outflow governor in response to pressure signals and in response to load sensed in the collector, by the proxy of monitoring motor current. The apparatus includes at least one heat transfer interface at which heat may be added to said reactor vessel and any contents thereof, and at least one moisture modification input or interface by which to modulate moisture level within said reactor vessel, whether by extraction at de-watering section 130 or taps 218, or by introduction at taps 214 (or 218, as may be). The outflow governor is connected to open in response to presence out feedstock in the collector and sensing of a minimum outflow pressure threshold.

The apparatus may include control logic to (a) shorten outflow governor closed time when resistance to packing of the outfeed collector increases; (b) lengthen outflow governor open time when resistance to packing of the outfeed collector increases; (c) increase the ratio of outflow governor open time to outflow governor closed time as proportions of total outflow governor cycle time; (d) bias said outflow governor to reduce outflow open time to a minimum threshold value; or (e) immediately to move said outflow governor to the closed position when pressure upstream therefrom falls below a designated set point value, or all of them.

The process for treating a loose fibrous feedstock includes establishing the loose fibrous feedstock in a reactor vessel at an elevated pressure relative to ambient; passing charges of the feedstock through a sudden expansion, which may be substantially adiabatic and isentropic; and controlling decompression cycle parameters in real time with a variable speed outflow valve.

The process may include using ball valve 242 as the variable speed outflow valve, and it may include driving ball valve 242 uni-directionally and varying speed in that one direction. The process includes employing sensors to observe pressure in the reactor vessel upstream of the outflow valve, and modulating operation of the outflow valve in response to pressure sensed upstream of the outflow valve. It may include at least one of: (a) maintaining the outflow valve in an open condition for less than one second; (b) maintaining the outflow valve in an open condition for $t_{Open}$, and maintaining the outflow valve in a closed condition for $t_{Closed}$ where $t_{Open}$, is less than ¼ of $t_{Closed}$; (c) sensing pressure drop upstream of the outflow valve while the outflow valve is open, and driving the outflow valve closed immediately if pressure drop exceeds a set threshold value, $P_{Dropref}$; (d) sensing presence of feedstock in a collector mounted upstream of the outflow valve, and inhibiting opening of the outflow valve unless feedstock is inferred to be present; (e) setting a minimum open condition time reference value, $t_{Ref}$, for the outflow valve, and biasing the opening time of the outflow valve, $t_{Open}$, toward $t_{Ref}$; (f) opening and closing the outflow valve in the range of 20 to 120 times per minute.

The process may include (a) opening and closing the outflow valve at least 40 times per minute; (b) maintaining a total cycle time, $t_{total}$, of less that 2 seconds, where $t_{total}$ is the sum of valve open time, $t_{Open}$, and valve closed time, $t_{Closed}$; (c) maintaining a ratio of valve open time, $t_{Open}$, and valve closed time, $t_{Closed}$ that is less than 1:5, or all of them. It may include providing a feedstock collector upstream of the outflow valve; providing a drive to pack feedstock into the collector; monitoring drive motor electrical current; monitoring pressure immediately upstream of the outflow valve; inhibiting opening of the outflow valve until drive motor electrical current exceeds a threshold current value, $I_{valveopen}$, and reactor pressure immediately upstream of the outflow valve is at least as great as a pressure minimum discharge triggering value, $P_{valve}$ open; closing the valve at the earliest of: (a) timing out against a set reference value, $t_{Long}$; (b) sensing a drop in electrical motor current to below a set reference value $I_{Lowref}$; (c) sensing a drop in pressure greater than a set reference value $P_{Dropref}$. The process may include biasing the outflow valve open time period, $t_{Open}$ to the shortest period of time consistent with the foregoing operating conditions, and biasing the ratio of outflow valve open time, $t_{Open}$, to outflow valve closed time, $t_{Closed}$, to the minimum value consistent with the other operating conditions.

The process may include heating the feedstock in the reaction chamber to a temperature corresponding to saturated water vapour temperature at the pressure of the reactor chamber, or maintaining a moisture level within the reaction chamber in a preset range, or both. It may include a ratio of valve open time, $t_{Open}$, to valve closed time, $t_{Closed}$, falls in the range of 3:1 and 10:1, or more narrowly, a ratio of valve open time, $t_{Open}$, to valve closed time, $t_{Closed}$, falls in the range of 5:1 and 8:1. Outflow control valve 242 may be inhibited from opening when the current draw is less than 70% of $I_{fl}$, and may be inhibited from closing when $I_{fl}$, is greater than 50% of $I_{fl}$. The process may have a target control valve time open, $t_{Open}$, of less than ½ second. The reactor vessel may be maintained at a pressure in excess of 190 psig, and temperature in the reactor vessel is maintained at the corresponding steam table saturated temperature. More narrowly the target reactor vessel pressure is 245 psig +/−5 psig. Control valve closing may be initiated on a fall in pressure of 2 psig, and is immediate on a fall in pressure of 5 psig.

Various embodiments have been described in detail. Since changes in and or additions to the above-described examples may be made without departing from the nature, spirit or scope of the invention, the invention is not to be limited to those details.

I claim:

1. An apparatus for processing fibrous organic feedstock, said apparatus comprising:
   a compressor operable to raise the fibrous organic feedstock to a processing pressure;
   a reactor vessel through which to process the fibrous organic feedstock under pressure;
   a discharge assembly mounted to receive the fibrous organic feedstock of the reactor vessel;
   said discharge assembly including a collector and a drive member operable to pack the fibrous organic feedstock into the collector;
   an outflow governor mounted to the collector, the outflow governor being movable between a closed position for retaining feedstock in the collector and an open position for permitting egress of the feedstock from the collector;
   said outflow governor having an outflow governor drive;
   said outflow governor drive having a continuously variable speed control; and
   said variable speed control is operable to alter both the duration of the outflow governor in the open position and the ratio of time spent in the open and closed positions.

2. The apparatus of claim 1 wherein the variable speed control is operable to cycle the outflow governor between open and closed conditions in excess of 40 times per minute.

3. The apparatus of claim 1 wherein the apparatus includes at least one of:
   (a) sensors operable to monitor pressure upstream of said outflow governor and said control is connected to cause operation of said outflow governor in response to pressure signals; and
   (b) sensors to monitor feedstock load in the collector, and said control is connected to cause operation of said outflow governor in response to load sensed in the collector.

4. The apparatus of claim 1 wherein said apparatus includes at least one heat transfer interface at which heat may be added to said reactor vessel and any contents thereof.

5. The apparatus of claim 1 wherein said apparatus includes at least one moisture modification input by which to modulate moisture level within said reactor vessel.

6. The apparatus of claim 1 wherein said outflow governor is a ball valve.

7. The apparatus of claim 6 wherein said outflow governor drive is a motor mounted to turn said ball valve continuously in one direction.

8. The apparatus of claim 1 wherein said apparatus includes at least one of
   (a) a diffuser connected to receive outflow from said outflow governor; and
   (b) a cyclone is connected downstream of said outflow governor.

9. The apparatus of claim 1 wherein said outflow governor is connected to open in response to presence of feedstock in the collector and sensing of a minimum outflow pressure threshold.

10. The apparatus of claim 1 wherein said controller has control logic to do any one of:
   (a) shorten outflow governor closed time when resistance to packing of the outfeed collector increases;
   (b) lengthen outflow governor open time when resistance to packing of the outfeed collector increases;
   (c) increase the ratio of outflow governor open time to outflow governor closed time as proportions of total outflow governor cycle time;
   (d) bias said outflow governor to reduce outflow open time to a minimum threshold value; and
   (e) immediately to move said outflow governor to the closed position when pressure upstream therefrom falls below a designated set point value.

* * * * *